United States Patent [19]
Maki et al.

[11] 3,960,090
[45] June 1, 1976

[54] LINEAR SYNCHRONOUS MOTOR POWERED VEHICLE

[75] Inventors: Naoki Maki, Ibaraki; Katsunori Suzuki, Takahagi, both of Japan

[73] Assignee: Hitachi, Ltd., Japan

[22] Filed: Aug. 2, 1974

[21] Appl. No.: 494,289

[30] Foreign Application Priority Data
Aug. 15, 1973 Japan.................. 48-90892

[52] U.S. Cl.................. 104/148 LM; 104/148 SS; 318/135
[51] Int. Cl.² ........................ B61B 13/08
[58] Field of Search ............. 104/148 LM, 148 MS, 104/148 SS; 310/12, 13; 318/135

[56] References Cited
UNITED STATES PATENTS

| | | | |
|---|---|---|---|
| 3,158,765 | 11/1964 | Polgreen | 104/148 LM |
| 3,594,622 | 7/1971 | Inagaki | 104/148 LM |
| 3,820,471 | 6/1974 | Maki | 104/148 SS |

FOREIGN PATENTS OR APPLICATIONS

| | | | |
|---|---|---|---|
| 9,768 | 7/1966 | Japan | 104/148 LM |

Primary Examiner—Trygve M. Blix
Assistant Examiner—Reinhard J. Eisenzopf
Attorney, Agent, or Firm—Craig & Antonelli

[57] ABSTRACT

The vehicle is powered by a linear synchronous motor, The linear synchronous motor comprises a series of field poles fitted on the vehicle body along its total length and a series of magnetic devices being provided along a track on the ground facing these field poles and developing a travelling magnetic field. A driving force developed between these field poles and the magnetic devices causes the vehicle to move.

Such a linear synchronous motor powered vehicle has a problem when securing proper and satisfactory places to mount the necessary equipment of the vehicle. The problem arises from the peculiar construction thereof that a plurality of field poles are disposed along the entire length of the vehicle body.

A satisfactory mounting of the apparatus may be attained by a unique arrangement of the field poles, without making the vehicle body large in size or providing discomfort to the passengers.

17 Claims, 10 Drawing Figures

LINEAR SYNCHRONOUS MOTOR POWERED VEHICLE

BACKGROUND OF THE INVENTION

1. Field of the Invention

This invention relates to a linear synchronous motor powered vehicle.

2. Description of the Prior Art

In the case of driving a vehicle, generally, adhesion is utilized which exists between the rail or the road and the wheels supporting the vehicle body to which the rotational power caused by the driving motor carried on the vehicle body is transferred through the reduction gear system. This vehicle running by adhesion, however, is inappropriate for a high speed running, for example, of more than 300 km/h. This is because, when the running speed thereof increases to be in excess of 300 km/h, the adhesion between the wheel and the road (or the rail) decreases abruptly.

This brings about efforts of searching for something other than the adhesion as a factor to drive the vehicle. Some of them have succeeded heretofore in practical use. One successful way is where the vehicle is driven without transmitting the driving force to the wheel. An example of such an idea, i.e. non-adhesion driving apparatus, is a linear motor where an electric motor operating in rotational mode is modified to a linear structure operating in linear mode.

In this linear motor category, there is a motor system wherein a group of magnetic devices of the linear motor is mounted on the vehicle body while another group of magnetic devices thereof are mounted on the road along the track thereon, and the same principle as that of the synchronous motor causes the vehicle to drive.

The present invention pertains to a vehicle powered by, particularly, the linear synchronous motor just mentioned in the linear motor category. An example of the linear synchronous motor powered vehicle of prior art will be described hereinafter with reference to FIGS. 1 and 2. In the figures, a vehicle body 1 supported by the wheels 2 moves along the rail constructed on the ground E, the vehicle body being provided at the bottom with superconductive field coils 4 substantially parallel with the ground E. A series of the field coils 4 are disposed on the vehicle body 1 in the longitudinal direction thereof, while the adjacent field poles are opposite in polarity to each other. Armature coils 3 being connected through a switching means to a power supply, are mounted along the rails on the ground facing up to the field coils 4. The armature coils 3 energized by the power supply, develop a shifting flux wave while the field coils 4 develop a magnetic field. The travelling magnetic flux wave interacts with the magnetic field thereby producing a driving force to drive or propel the vehicle body 1.

The linear synchronous motor powered vehicle just described is of a type that the vehicle body 1 is supported by the wheel 2. The linear synchronous motor may also be applicable to such a type of vehicle where the vehicle body 1 is supported by using the levitation magnetically caused, as shown in FIG. 3.

In FIG. 3 illustrating the magnetically levitated vehicle, two pairs of superconductive coils 6A and 6B, and, 7A and 7B, are mounted in a housing 5 at the bottom of the vehicle body 1. The respective super-conductive coils 6A and 6B are mounted, facing the ground E, on the bottom of the two U-shaped portions of the housing 5. The field coils 7A and 7B are mounted, facing each other, at the reversed U-shaped portion of the housing at the center thereof. The field coils 7A and 7B are disposed normal to the field coils 6A and 6B. The ground E is provided with the levitation coils 10A and 10B and the field coils 6A and 6B, the former confronting the latter. A stabilizing coil 8 is disposed between the field coils 7A and 7B. The levitation coils 10A and 10B and the stabilizing coil 8 are all short-circuited or each of them are constructed of a conductive single sheet. The armature coil 9 for the linear synchronous motor is located between the levitation coils 10A and 10B. The propulsion of the vehicle body 1 in this case is made in the same manner as described above (FIGS. 1 and 2). That is to say, the vehicle body is driven by the driving force caused by the interaction of the travelling flux wave developed by the armature coil 9 with the magnetic field developed by the field coils 7A and 7B. As the vehicle body 1 moves, magnetic mutual repulsion occurs between the field coils 6A and 6B and the corresponding the levitation coils 10A and 10B, between the field coils 7A and the stabilizing coil 8, and between the field coil 7B and the stabilizing coil 8. By this mutual repulsion therebetween, the vehicle body is levitated with stabilization.

These field coils mentioned above, 4, 6A, 6B, 7A, and 7B, i.e. the field poles 12, are normally disposed on the vehicle along the length L thereof, as shown in FIG. 4. What are mounted on the vehicle, however, are not only these magnetic poles but also an auxiliary power supply, a cooling system, and other devices. Further, the place on the vehicle body where such systems or devices are to be mounted is confined to the underfloor thereof. Thus, it is not possible to use the entire underfloor of the vehicle 1 for mounting the magnetic poles 12. Thus, in actual practice, a compromise is made and the area for mounting the field poles 12, e.g. the length of the field pole 12, is reduced for securing the necessary equipment such as the auxiliary power supply, the cooling system, and other devices. Accordingly, it is necessary to make the length of the field pole 12 somewhat shorter than a pole pitch P. Here, the pole pitch P is defined as the interval between the adjacent field poles in the continuously disposed ones.

This sizable reduction in the length of the field pole 12 brings about various disadvantages. One of them is to produce a noticeable pulsation in the propulsion. In the case of linear synchronous motor, there are produced the right and left directional force and the up and down directional force, besides the propulsion. These forces exhibit large pulsations similar to that in the propulsion as shown in FIG. 5, resulting in discomfort to the passengers, as well as undesirable effects on the vehicle body, in particular, the vehicle of such a type that its body is magnetically levitated.

It is obvious that, when the length of the field pole is shorter than the pole pitch P, the pulsation occurs in the propulsion. That is to say, the flux distribution caused by the field poles are uneven all over the pole pitch P, with a low flux density at the both ends. In other words, the shorter the length that the field pole 12 is with respect to the pole pitch P, the narrower the uniformity region of the flux density becomes. For this reason, the propulsion decreases at certain positions of the vehicle.

The vehicle body 1 is provided at its both ends with couplers 11 for coupling with the adjacent vehicle bodies. Accordingly, the length L of one vehicle including the couplers is more elongated, and thus the pole pitch also is enlarged. On the other hand, with the actual field pole 12 is impossible to make an elongation of the length thereof, since it has the restriction above mentioned of the elongation thereof. Thus, the length of the field pole 12 is sizably shorter than that of the pole pitch P so that a larger pulsation occurs in the propulsion, the right and left directional force, and the up and down directional force.

There are some countermeasures to restrict such a detrimental pulsation. One of them is to use the field poles 12 whose length is substantially equal to the pole pitch P. This method, however, has a disadvantage in that the place for mounting the necessary equipment such as the auxiliary power supply, can not be secured. An easy way to secure the place for the necessary equipment is to enlarge the cross section of the vehicle body by the space required to accommodate the necessary equipment.

This method of simply enlarging the cross section thereof, however, is accompanied by various problems. That is, air resistance increases when the vehicle is running, and the weight of the vehicle body also increases. For this reason, a larger capacity power source is required to drive the vehicle of such a structure, and the manufacturing cost is high.

Accordingly, the only way to restrict the pulsation occuring in the propulsion, the right and left directional force, and the up and down directional force to obtain a comfortable ride for the passengers is to bring the field pole length close to the optimum length allowing it to be substantially equal to the pole pitch.

SUMMARY OF THE INVENTION

An object of the present invention, thus, is to provide a linear synchronous motor powered vehicle capable of providing a place to mount the necessary equipment such as the auxiliary power supply, and the cooling system, and other devices, without enlargement of the vehicle body.

Another object of the present invention is to provide a linear synchronous motor powered vehicle having a small pulsation in the propulsion.

A feature of the present invention resides in that, in the vehicle in which a plurality of field poles are to be disposed along the vehicle body in the direction of progress thereof, one or more field poles are omitted, i.e. an interval containing no field poles, is provided in one or more of the field pole positions.

By the provision of one or more intervals containing no field poles, it is possible to use these intervals for mounting the necessary equipment.

The provision of such an interval also enables the field pole length to approach the pole pitch. For example, if an interval containing no field poles is ½ pole pitch in length and is provided at each end of the vehicle body along the direction of progress thereof, then one pole pitch length is provided on the entire length of the vehicle body, and it is possible to make the length of the field pole substantially equal to the pole pitch.

DESCRIPTION OF THE PREFERRED EMBODIMENTS

Figure 1:
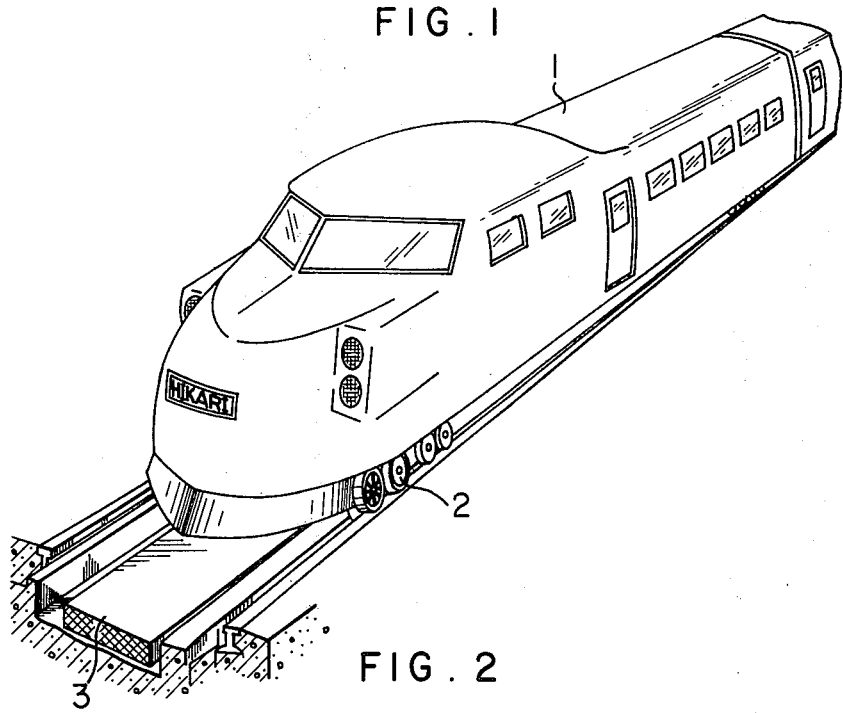
FIG. 1 is a perspective view illustrating the appearance of a linear synchronous motor powered vehicle.
Figure 2:
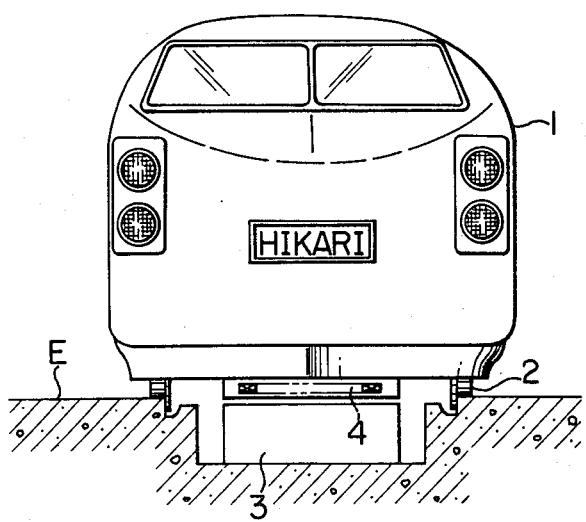
FIG. 2 is a front view of that shown in FIG. 1.
Figure 3:
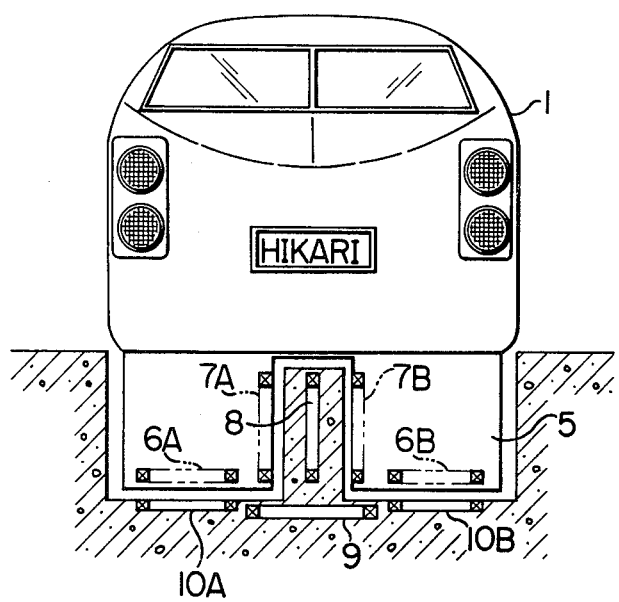
FIG. 3 is a front view of a linear synchronous motor powered vehicle which is of a magnetically levitated type.
Figure 4:
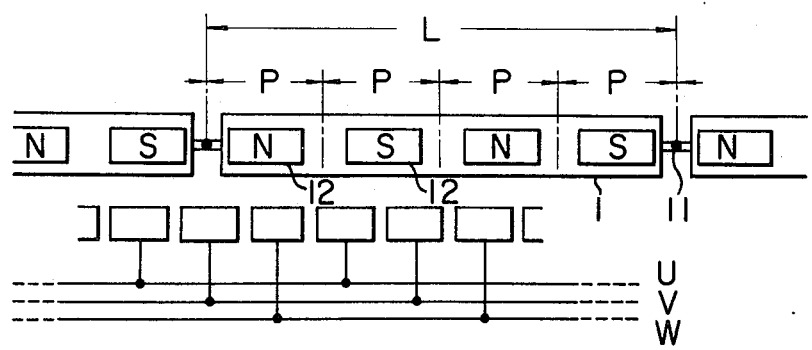
FIG. 4 diagrammatically illustrates a disposition of field poles in the conventional linear synchronous motor powered vehicle.
Figure 5:
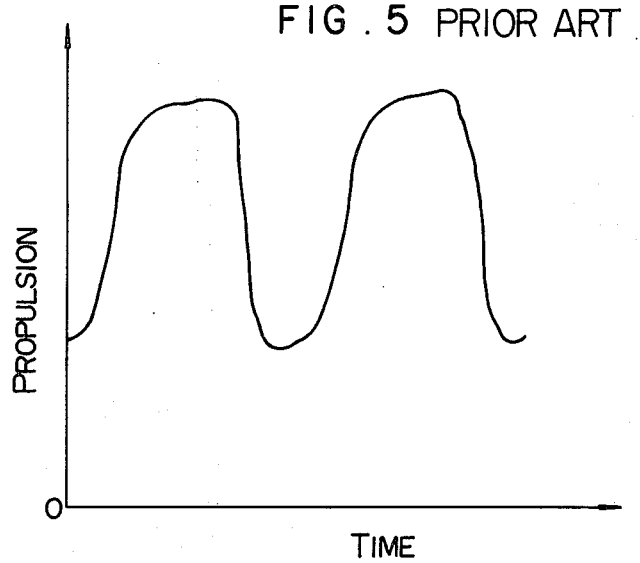
FIG. 5 is a graph illustrating the variation of the propulsion obtained by the field pole disposition shown in FIG. 4.

An embodiment of the present invention will be described with reference to FIG. 6. Field poles 12A and 12B are disposed on a vehicle body 1 in the longitudinal direction thereof with an arrangement that adjacent field poles are opposite in polarity. These field poles may be constructed using either an electromagnet or a permanent magnet as well as a superconductive field coil. In addition, means for suspending the vehicle body 1 is not limited to a particular one. The vehicle body may be suspended by the wheels or levitated by using the magnetic repulsion or the force generated by an air jet.

The vehicle body is provided at both the ends in the longitudinal direction thereof with couplers 11. The vehicle length L is the distance from the center of the coupler at one end of the vehicle body to the center of the coupler at the other end thereof. The vehicle length L is selected to be an integer multiple of the pole pitch P and thus the number of the field poles 12A, 12B and 13A, 13B is determined depending upon L/P.

Armature coils 3 are located on the ground confronting the vehicle body 1 along the track, the armature coils being opposite to the field poles 12A, 12B and 13A, 13B. The armature coils 3 are connected to a three phase a.c. power source through a switching means (not shown) so that a travelling magnetic field is developed when the vehicle passes the armature coils.

In the thus constructed linear synchronous motor powered vehicle, if the lengths of field poles 12A, 12B and 13A, 13B are designed to be equal to the pole pitch P, the field poles 13A and 13B positioned at both the ends of the vehicle body in the longitudinal direction, project to the outside of the vehicle body. Thus, these field poles are impossible to mount, and no space for the necessary equipment is obtained. For this reason, no field poles are provided for the pole pitches P positioned at both the ends of the vehicle body 1 thereby to form space portions thereat.

Such arrangement of the field poles and the pole pitches enables the remaining field poles 12A and 12B to be substantially equal to the pole pitch P in length without any restriction.

By employing this construction technique, the space portion corresponding to one pole may be secured at each end of the vehicle body 1 in the longitudinal direction. These space portions are available as the place for installing the necessary equipment such as the auxiliary power source and the cooling system and other devices. It is to be noted that since the place for installing the necessary equipment etc. may be secured, it is possible to select the length of the respective field poles 12A and 12B without any restriction of the necessary equipment and the couplers 11.

As seen from the foregoing description, since the lengths of the respective field poles 12A and 12B are freely selected, the field pole length may be designated to be substantially equal to the pole pitch P. As a result, the pulsation in the propulsion may be greatly reduced. FIG. 7 illustrates in the wave form the variation of propulsion obtained when the field poles 12A and 12B are arranged as shown in FIG. 6. It can be seen from FIG. 7 that the propulsion pulsation is greatly reduced and, therefore, the comfort of the passengers is greatly improved. In the case of the vehicle which is suspended by the levitation due to magnetic force or air jets, the force exerted in the right and the left direction and the force exerted in the up and down direction may also be reduced, thereby resulting in stable running.

Figure 6:
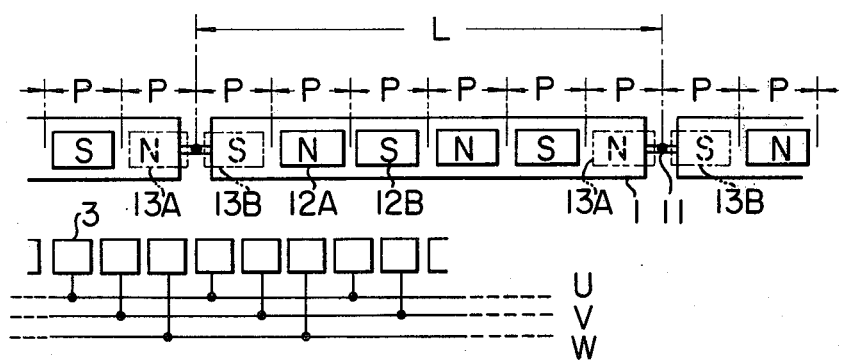
FIG. 6 shows in diagrammatical form a disposition of field poles in the linear synchronous motor powered vehicle in accordance with the present invention.
Figure 7:
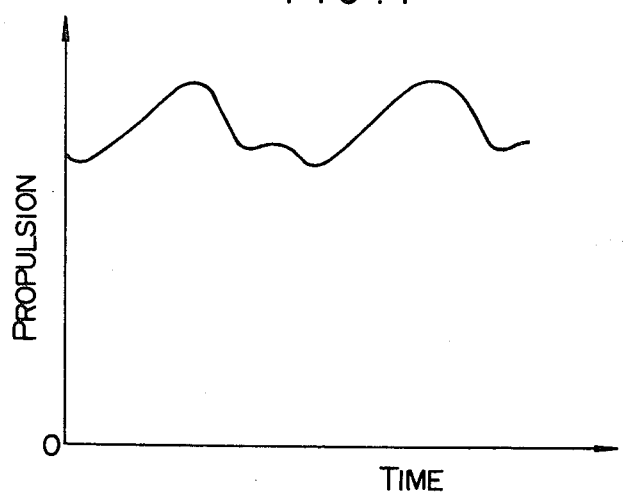
FIG. 7 is a graph illustrating the variation of the propulsion obtained by the field pole disposition shown in FIG. 6.

In the case of the field pole arrangement shown in FIG. 6, the space portion corresponding to two pole pitches is formed between the adjacent vehicle bodies 1. The affect of the space portion on the vehicle running, however, is substantially negligible due to the fact that a little magnetic flux caused by the field poles develops in the space portion.

The fact that the space portion is provided at each end of the vehicle body provides the place for installation of the couplers 11 so that an appropriate form of the coupler may be employed without taking into account the size thereof or the structure for mounting.

Figure 8:
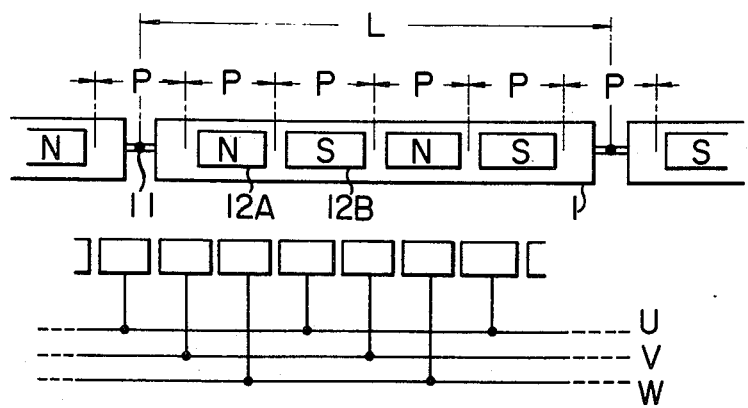
FIGS. 8 through 10 show other dispositions of field poles in the linear synchronous motor powered vehicle according to the invention, respectively.

In the example above described, the vehicle body 1 is provided at each end thereof in the longitudinal direction with a space portion corresponding to one pole pitch. As shown in FIG. 8, however, the corresponding space portion of ½ a pole pitch is provided at each end of the vehicle body 1 and the space portion of the whole of the vehicle body is equal to one pole pitch.

In the example of FIG. 8, the space portion is shorter than that in the FIG. 6 example by one pole pitch, except for that effects similar to those of the embodiment above mentioned are attainable.

The vehicle length L shown in FIG. 8 is equal to that of FIG. 6. The number of pole pitches per the vehicle length L, however, is 4P + (P/2) × 2, i.e. five pole pitches, and is less than six pole pitches of the previous embodiment by one pole pitch. The number of the field poles 12A and 12B actually disposed is equal to that of FIG. 6. For this, the propulsion per the vehicle length is large compared with that obtained by the field pole arrangement shown in FIG. 6. Further, in the vehicle whose suspension is made by using levitation caused by the magnetic force or air jets, the pitching of the vehicle body 1 may be restricted thereby to give a stable running of the vehicle.

If the sum of the longitudinal length of the space portion (no field pole portion) provided at both ends of the vehicle body 1 is a multiple of the pole pitch P, a regularity of the field pole arrangement where different field poles of N and S are alternatively arranged, exists in the whole arrangement of the field poles including virtual poles of no existance. If the regularity of the field arrangement is obtained, a synchronous motor may be formed. Thus, the operation and effects similar to those of the embodiment shown in FIG. 6 may be attained.

Figure 9:
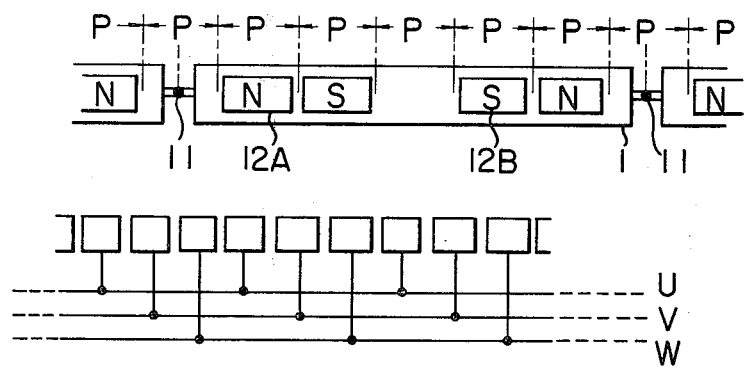

Referring now to FIG. 9, there is shown another embodiment of the invention, in which the space portion of ½ pole pitch is provided at both the ends of the vehicle body 1 and the space portion of one pole pitch also is provided at the center thereof, securing the space portion (no pole piece portion) of the whole vehicle body whose length is equal to two pole pitches. In the embodiment, however, the number of the field poles 12A and 12B is the same as those of FIG. 6. Because of such arrangement of field poles, each of the space portion of ½ pole pitch at both the ends of the vehicle may be used for accommodating the respective coupler 11 while the space portion of one pole pitch for accommodating the necessary equipment. The result is that the necessary equipment and the couplers may be mounted without restriction to each other, thus resulting in ease of design.

Provision of the space portion of one pole pitch at the center of the vehicle body results in such a disposition that field poles 12A and 12B are provided at both the end sides of the vehicle body. Especially, in the vehicle which is levitated magnetically or pneumatically, the pitching of the vehicle body 1 may be restricted to enable the vehicle to run stably.

Figure 10:
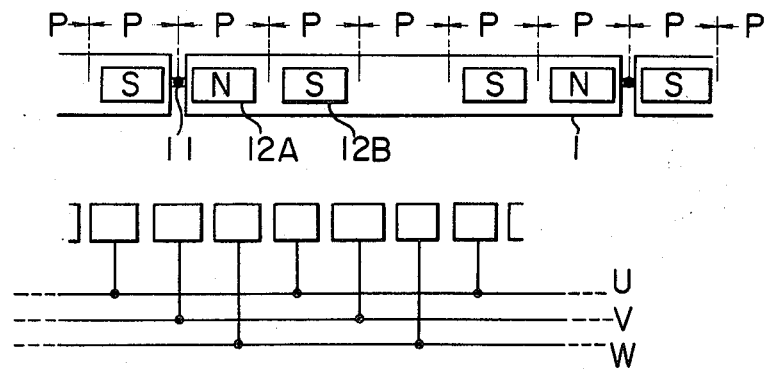

An embodiment shown in FIG. 10 is the modified one of that shown in FIG. 9. In the embodiment of the arrangement of the field poles 12A and 12B, the couplers 11 employed are of small size so that no space portions are necessary which are provided at both the ends of the vehicle body 1 and the space portion is provided only at the center portion thereof, the space portion being for installing the necessary equipments. In this case, the space portion of one pole pitch at both the ends of the vehicle body 1 shown in FIG. 9 is removed, with the result that the field poles 12A and 12B are disposed much closer to both ends of the vehicle body 1. The effect resulting from the thus arranged embodiment is to more effectively prevent the pitching of the vehicle body.

As in the foregoing description, in the present invention, no field pole portion of more than one field pole is provided in the linear synchronous motor powered vehicle in which a plurality of field poles are arranged along the direction of progress of vehicle. This no field pole portion may be used for accommodating the necessary equipment such as the auxiliary power source and the cooling system. Accordingly, the effects of the invention are that a large-sized vehicle is unnecessary and the design of the place for installation of the necessary equipment is easy.

Besides this, because of the provision of a least one interval containing no field poles in a field pole position along the vehicle body, the length of the field poles along the direction of the vehicle progression may be brought close to the pole pitch. Accordingly, the pulsation in the propulsion may be controlled to be small compared with the conventional system in which the auxiliary power source and the cooling system are installed in the space being formed between the pole pitch and the length of the field pole which is sizably shorter than the pole pitch, thereby resulting is stable running of the vehicle.

While there have been described what are at present considered preferred embodiments of the invention, it will be obvious to those skilled in the art that various changes and modifications may be made within the scope of the invention.

We claim:

1. A linear synchronous motor powering system for vehicles comprising:
   a magnetic means for developing a traveling magnetic field, said magnetic means being provided along a track;
   a supporting means for supporting a vehicle body on the track, said supporting means being provided at each vehicle body;
   a plurality of field poles corresponding to said magnetic means, said field poles being disposed with a predetermined pole pitch along the length of the vehicle body; and
   at least one interval along the length of the vehicle body formed in the alignment of said plurality of field poles along the vehicle body, each said interval containing no field poles and being equal to an integer multiple of said pole pitch.

2. A linear synchronous motor powering system for vehicles according to claim 1, wherein said interval is disposed symmetrically with respect to the longitudinal center of the vehicle body.

3. A linear synchronous motor powering system for vehicles according to claim 1, wherein auxiliary equipment is placed in said interval containing no field poles.

4. A linear synchronous motor powering system for vehicles comprising:
   a magnetic means for developing a traveling magnetic field, said magnetic means being provided along a track;
   a supporting means for supporting a vehicle body on the track, said supporting means being provided at each vehicle body;
   a plurality of field poles corresponding to said magnetic means, said field poles being disposed with a predetermined pole pitch along the length of the vehicle body; and
   an interval containing no field poles formed at each of the opposite ends of the vehicle body in the alignment of said plurality of field poles along the vehicle body, the sum of said respective intervals being selected to be an integer multiple of said pole pitch.

5. A linear synchronous motor powering system for vehicles according to claim 4, wherein each of said intervals is equal to one half of said pole pitch.

6. A linear synchronous motor powering system for vehicles according to claim 5, wherein said system further comprises at least one additional interval containing no field poles formed in the alignment of said plurality of field poles along the vehicle body, each said additional interval being equal to an integer multiple of said pole pitch.

7. A linear synchronous motor powering system for vehicles according to claim 6, wherein said additional interval is disposed symmetrically with respect to the longitudinal center of the vehicle body.

8. A linear synchronous motor powering system for vehicles according to claim 4, wherein each of said intervals is equal to one pole pitch.

9. A linear synchronous motor powering system for vehicles according to claim 8, wherein said system further comprises at least one additional interval containing no field poles formed in the alignment of said plurality of field poles along the vehicle body, each said additional interval being equal to an integer multiple of said pole pitch.

10. A linear synchronous motor powering system for vehicles according to claim 9, wherein each said additional interval is disposed symmetrically with respect to the longitudinal center of the vehicle body.

11. A linear synchronous motor powering system for vehicles according to claim 4, wherein said system further comprises at least one additional interval containing no field poles formed in the alignment of said plurality of field poles along the vehicle body, each said additional interval being equal to an integer multiple of said pole pitch.

12. A linear synchronous motor powering system for vehicles comprising:
   a magnetic means for developing a travelling field, said magnetic means being provided along a track;
   a levitating means for magnetically levitating a vehicle body, said levitating means being provided along the track and at each vehicle body;
   a plurality of field poles corresponding to said magnetic means, said field poles being disposed with a predetermined pole pitch along the length of the vehicle body; and
   at least one interval along the length of the vehicle body formed in the alignment of said plurality of field poles along the vehicle body, each said interval containing no field poles and being equal to an integer multiple of said pole pitch.

13. A linear synchronous motor powering system for vehicles comprising:
   a magnetic means for developing a travelling field, said magnetic means being provided along a track;
   a levitating means for magnetically levitating a vehicle body, said levitating means being provided along the track and at each vehicle body;
   a plurality of field poles corresponding to said magnetic means, said field poles being disposed with a predetermined pole pitch along the length of the vehicle body; and
   an interval containing no field poles formed at each of the opposite ends of the vehicle body in the alignment of said plurality of field poles along the vehicle body, the sum of said intervals being selected to be an integer multiple of said pole pitch.

14. A linear synchronous motor powering system for vehicles comprising:
   armature coils for developing a travelling magnetic field;
   stabilizing coils;
   levitating coils;
   said armature coils, said stabilizing coils and said levitating coils being provided along a track on the ground;
   first superconductive field coils magnetically coupled with said levitating coils;
   second superconductive field coils magnetically coupled with said stabilizing coils and said armature coils;
   said first and second superconductive field coils being disposed with a predetermined pole pitch along the length of each vehicle body; and
   at least one interval along the length of the vehicle body formed in the alignment of said first and second superconductive field coils along the vehicle body, each said interval containing no field coils and being equal to an integer multiple of said pole pitch.

15. A linear synchronous motor powering system for vehicles comprising:
   armature coils for developing a travelling magnetic field;

stabilizing coils,
levitating coils,
said armature coils, said stabilizing coils and said levitating coils being provided along a track on the ground;
first superconductive field coils magnetically coupled with said levitating coils;
second superconductive field coils magnetically coupled with said stabilizing coils and said armature coils;
said first and second superconductive field coils being disposed with a predetermined pole pitch along the length of each vehicle body; and
an interval containing no field coils formed at each of the opposite ends of the vehicle body in the alignment of said first and second superconductive field coils along the vehicle body, the sum of said intervals being selected to be an integer multiple of said pole pitch.

16. A linear synchronous motor powering system for vehicles comprising:
a magnetic means for developing a travelling magnetic field, said magnetic means being provided along a rail on the ground;
wheels for rotatably supporting a vehicle body on the rail, and wheels being provided at each vehicle body;
a plurality of field poles corresponding to said magnetic means, said field poles being disposed with a predetermined pole pitch along the length of the vehicle body in a manner that adjacent field poles are each opposite in polarity; and
at least one interval along the length of the vehicle body formed in the alignment of said plurality of field poles along the vehicle body, each said interval containing no field poles and being equal to an integer multiple of said pole pitch.

17. A linear synchronous motor powering system for vehicles comprising:
a magnetic means for developing a travelling magnetic field, said magnetic means being provided along a rail on the ground;
wheels for rotatably supporting a vehicle body on the rail, said wheels being provided at each vehicle body;
a plurality of field poles corresponding to said magnetic means, said field poles being disposed with a predetermined pole pitch along the length of the vehicle body in a manner that adjacent field poles are each opposite in polarity; and
an interval containing no field poles formed at each of the opposite ends of the vehicle body in the alignment of said plurality of field poles along the vehicle body, the sum of said intervals being selected to be an integer multiple of said pole pitch.

* * * * *